(12) United States Patent
Wilcox et al.

(10) Patent No.: US 9,948,967 B2
(45) Date of Patent: Apr. 17, 2018

(54) DATABASE TABLE STORAGE TECHNIQUES FOR VIDEO DELIVERY SERVICE AUTHORIZATION

(71) Applicant: HULU, LLC, Santa Monica, CA (US)

(72) Inventors: Philip Wilcox, Santa Monica, CA (US); Anil Vaitla, Santa Monica, CA (US)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 15/092,390

(22) Filed: Apr. 6, 2016

(65) Prior Publication Data

US 2017/0295388 A1    Oct. 12, 2017

(51) Int. Cl.
| | |
|---|---|
| H04N 21/266 | (2011.01) |
| H04N 21/24 | (2011.01) |
| H04N 21/231 | (2011.01) |
| H04N 21/25 | (2011.01) |
| H04N 21/278 | (2011.01) |
| H04N 21/258 | (2011.01) |
| G06F 17/30 | (2006.01) |
| H04N 21/43 | (2011.01) |
| H04N 21/433 | (2011.01) |
| H04N 21/20 | (2011.01) |
| H04N 21/21 | (2011.01) |
| H04N 21/23 | (2011.01) |
| H04N 21/218 | (2011.01) |
| H04N 21/27 | (2011.01) |

(52) U.S. Cl.
CPC ..... *H04N 21/266* (2013.01); *G06F 17/30023* (2013.01); *H04N 21/20* (2013.01); *H04N 21/21* (2013.01); *H04N 21/218* (2013.01); *H04N 21/23* (2013.01); *H04N 21/23109* (2013.01); *H04N 21/2407* (2013.01); *H04N 21/251* (2013.01); *H04N 21/25875* (2013.01); *H04N 21/27* (2013.01); *H04N 21/278* (2013.01); *H04N 21/43* (2013.01); *H04N 21/4332* (2013.01)

(58) Field of Classification Search
None
See application file for complete search history.

(56) References Cited

U.S. PATENT DOCUMENTS

| | | | |
|---|---|---|---|
| 7,069,576 B1 * | 6/2006 | Knudson | H04N 5/44543 348/E5.105 |
| 2005/0125310 A1 * | 6/2005 | Hazi | G06F 17/30392 705/26.5 |
| 2008/0133525 A1 * | 6/2008 | Ott | G06F 17/30053 |

(Continued)

*Primary Examiner* — Justin Shepard
(74) *Attorney, Agent, or Firm* — Fountainhead Law Group P.C.

(57) ABSTRACT

Particular embodiments generate a database table that keeps track of authorization package combinations for videos being offered by a video delivery service. The table may allow the video delivery service to keep track of how much content is available for a specific authorization package combination that a user might have access to In one embodiment, the video delivery service does not pre-generate every single possible authorization package combination on a per-show basis. Rather, only a subset of the authorization package combinations is generated for each show. Then, the video delivery service uses a query to the database table that can calculate which content a user is authorized to access from the subset of authorization package combinations that were generated.

21 Claims, 11 Drawing Sheets

(56) References Cited

U.S. PATENT DOCUMENTS

2009/0125414 A1* 5/2009 Kleinrock .......... G06Q 30/0283
                                                    705/26.1
2012/0158536 A1* 6/2012 Gratton .............. G06Q 30/0631
                                                    705/26.7

* cited by examiner

| Show_id | Device_id | Package_group_id | Episodes_count |
|---|---|---|---|
| 35 | 1 | 2 | 113 |
| 35 | 1 | 256 | 8 |
| 35 | 1 | 258 | 121 |

FIG. 3A

SELECT * FROM show_sparse_rollups WHERE show_id = %d AND device_id = %d AND package_group_id = (SELECT MAX(package_group_id) FROM show_sparse_rollups WHERE show_id = %d AND device_id = %d AND package_group_id & %d = package_group_id)

| Package_group_id (302-3) | Package_group_id & 29379 (322) |
|---|---|
| 2 | 328 — 2 |
| 256 | 324 — 0 |
| 258 | 326 — 2 |

FIG. 3D

DATABASE TABLE STORAGE TECHNIQUES FOR VIDEO DELIVERY SERVICE AUTHORIZATION

BACKGROUND

A video delivery service includes a large library of videos that can be delivered to a large number of users. The video delivery service may not offer every video in the library of videos to all users. For example, the video delivery service may have authorization packages that include different videos. The videos that are available to a user depends on which authorization packages a user's account has access to. For example, a user may subscribe to a television channel authorization package to receive the television shows for that television channel. However, a second user may not subscribe to that television channel authorization package and should not receive those television shows. Accordingly, each specific user may have access to different videos.

The above example is only one simple combination. In operation, the video delivery service may have a large number authorization packages, which means there are an even larger number of possible combinations. To quickly determine which shows or videos a user has access to, the video delivery service may generate every single possible combination. Then, an exact match for a user may be found that indicates which videos the user can access. This is the fastest way to determine which videos a user can access. However, when adding a new package, the number of possible combinations doubles leading to more required storage space. Further, the time that it takes to generate every single possible package combination to take into account the new package gets longer and longer as the number of packages increases.

SUMMARY

In one embodiment, a method includes: generating, by a computing device, a first subset of a plurality of possible combinations for authorization packages for a video entity including video sub-entities; storing, by the computing device, the first subset of possible combinations in a database table, wherein a second subset of possible combinations of the plurality of combinations is not stored in the database table; selecting, by the computing device, a user package group identifier for a user of a video delivery service in which a user package group authorization needs to be computed; generating, by the computing device, a query to the database table for the user package group authorization, the query selecting a plurality of the first subset of possible combinations and then selecting an authorization package combination from the plurality of the first subset of possible combinations; and using, by the computing device, the authorization package combination to provide access to a set of video sub-entities of the video entity for the video delivery service to the user.

In one embodiment, a non-transitory computer-readable storage medium contains instructions, that when executed, control a computer system to be configured for: generating a first subset of a plurality of possible combinations for authorization packages for a video entity including video sub-entities; storing the first subset of possible combinations in a database table, wherein a second subset of possible combinations of the plurality of combinations is not stored in the database table; selecting a user package group identifier for a user of a video delivery service in which a user package group authorization needs to be computed; generating a query to the database table for the user package group authorization, the query selecting a plurality of the first subset of possible combinations and then selecting an authorization package combination from the plurality of the first subset of possible combinations; and using the authorization package combination to provide access to a set of video sub-entities of the video entity for the video delivery service to the user.

In one embodiment, an apparatus includes: one or more computer processors; and a non-transitory computer-readable storage medium comprising instructions, that when executed, control the one or more computer processors to be configured for: generating a first subset of a plurality of possible combinations for authorization packages for a video entity including video sub-entities; storing the first subset of possible combinations in a database table, wherein a second subset of possible combinations of the plurality of combinations is not stored in the database table; selecting a user package group identifier for a user of a video delivery service in which a user package group authorization needs to be computed; generating a query to the database table for the user package group authorization, the query selecting a plurality of the first subset of possible combinations and then selecting an authorization package combination from the plurality of the first subset of possible combinations; and using the authorization package combination to provide access to a set of video sub-entities of the video entity for the video delivery service to the user.

The following detailed description and accompanying drawings provide a better understanding of the nature and advantages of particular embodiments.

BRIEF DESCRIPTION OF THE DRAWINGS

FIG. 3A depicts an example of an authorization table showing authorization package combinations according to one embodiment.

FIG. 3B shows an example of a query according to one embodiment.

FIG. 3C shows the first sequence of bits and the second sequence of bits according to one embodiment.

FIG. 3D shows an example of an expanded table to include the result of the binary "&" operation according to one embodiment.

DETAILED DESCRIPTION

Described herein are techniques for a video delivery service authorization system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments generate a database table that keeps track of authorization package combinations for videos (e.g., movies or shows) being offered by a video delivery service. The table may allow the video delivery service to keep track of how much content is available for a specific authorization package combination that a user might have access to as well as when a latest episode was added for a show. Keeping track of when the latest episode was added may be important in generating an interface for the user and/or providing recommendations. In one embodiment, the video delivery service does not pre-generate every single possible authorization package combination on a per-show basis. Rather, only a subset of the authorization package combinations is generated for each show. Then, the video delivery service uses a query to the database table that can calculate which content a user is authorized to access from the subset of authorization package combinations that were generated. In one embodiment, an exact match of which authorization package combination is applicable to the user is not found in the database table. However, using the query, the video delivery service can calculate which authorization package combination applies to the user.

System Overview

Figure 1:
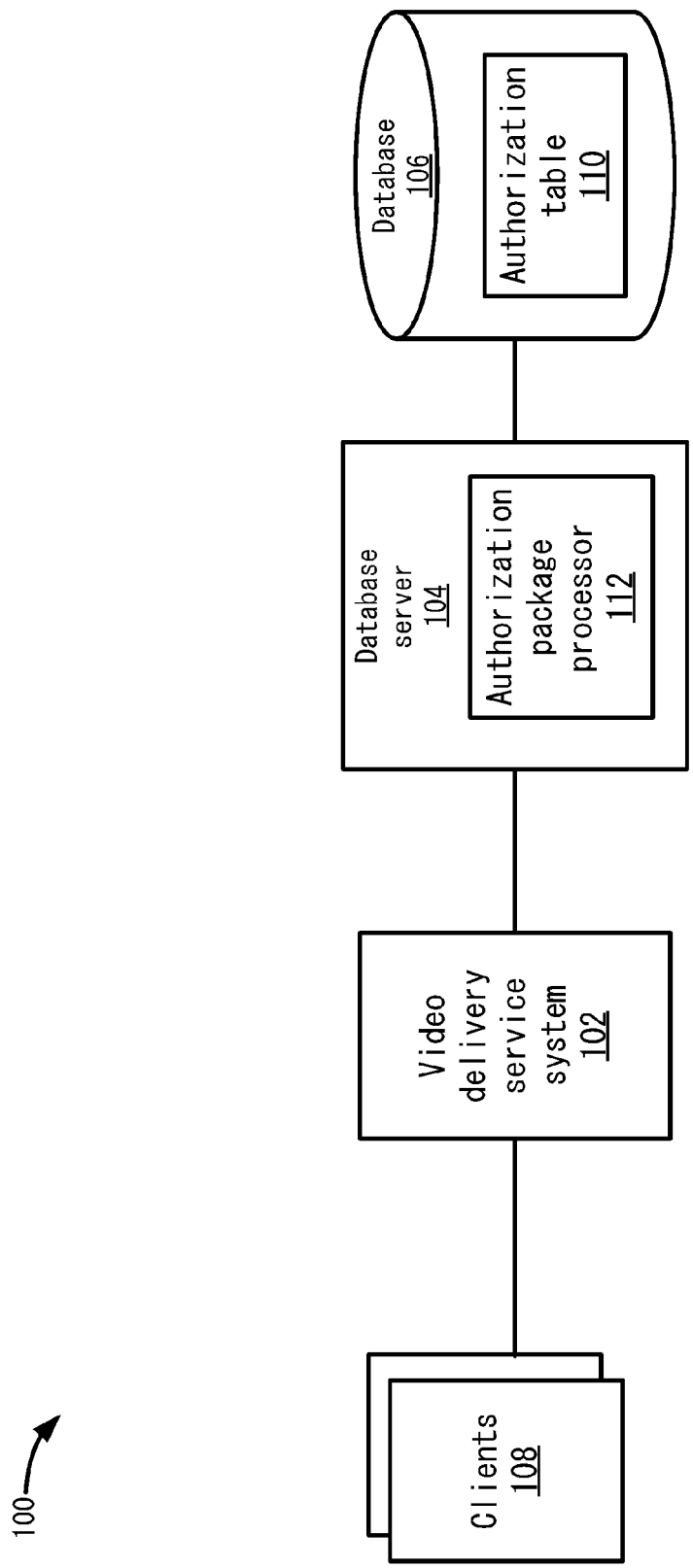
FIG. 1 depicts a simplified system for calculating which authorization package combination is applicable to a user according to one embodiment.

FIG. 1 depicts a simplified system 100 for calculating which authorization package combination is applicable to a user according to one embodiment. System 100 includes a video delivery service system 102, a database server 104, and a database 106. Users may use clients 108 to access a video delivery service through video delivery service system 102. For example, video delivery service system 102 may include a number of servers that communicate with clients 108.

One aspect of the video delivery service is providing videos on-demand to clients 108. Video delivery service system 102 generates a user interface for the users that lists videos that are available to the user. As discussed above, the video delivery service may include a large number of videos. These videos may include movies, shows that include multiple episodes and seasons, shorts, and other content. A user may only be allowed to access a certain subset of the videos. In one example, different authorization packages are required to access different videos. For example, the user may be authorized to access showed offered by a first channel, but not shows offered by a second channel. However, there may be hundreds and thousands of different authorization packages. This creates a huge number of possible combinations. As will be discussed below, video delivery service system 102 may use authorization table 110 to determine which videos a user can access.

An authorization package processor 112 generates a subset of possible authorization package combinations for videos being offered. The authorization package combinations may be generated for each video (e.g., show or movie). In one embodiment, the authorization package combinations are only for a video entity that includes sub-entities. For example, a show may include episodes, a show may include clips, a movie may include previews, etc. Authorization package combinations can indicate when the last time a new sub-entity for a video entity became available for a user. This is a more complicated query than just determining if a user has access to a movie or not. Thus, a single video entity without sub-entities may not be included in authorization package combination calculation. The subset of authorization package combinations is stored in authorization table 110. A single table will be described, but it will be understood that the authorization package combinations can be stored in multiple tables. Also, the single table may include all video entities or separate tables for each video entity may be used. For discussion purposes, the term "show" may be used, but this may be a video entity, and the term "episodes" may be used, but this may be a video sub-entity.

In generating the subset of possible authorization package combinations, not all authorization package combinations are generated for a video. For example, if 6000 possible combinations exist for a show, authorization package processor 112 may only generate combinations for 3 authorization package combination, but not the other possible combinations. The other package combinations may not be generated because they do not affect whether or not the user has access to the show. Authorization package processor 112 may generate rows for the different combinations for authorization packages 1, 2, and 3. Each row may be referred to as a "package group", which may be an authorization package combination. It should be noted that authorization package combinations may be combinations that include only one package, or combinations of multiple packages. That is, there may be 8 different package group combinations from these three authorization packages that include the 3 single packages themselves, package 1 and package 2, package 1 and package 3, package 2 and package 3, and packages 1, 2, and 3. However, if all possible authorization package combinations were generated for this show, then 6000 rows would be needed instead of only 8 rows. This concept is described in more detail below with respect to FIGS. 2A-2C.

Package Combination Generation Examples

Figure 2A:
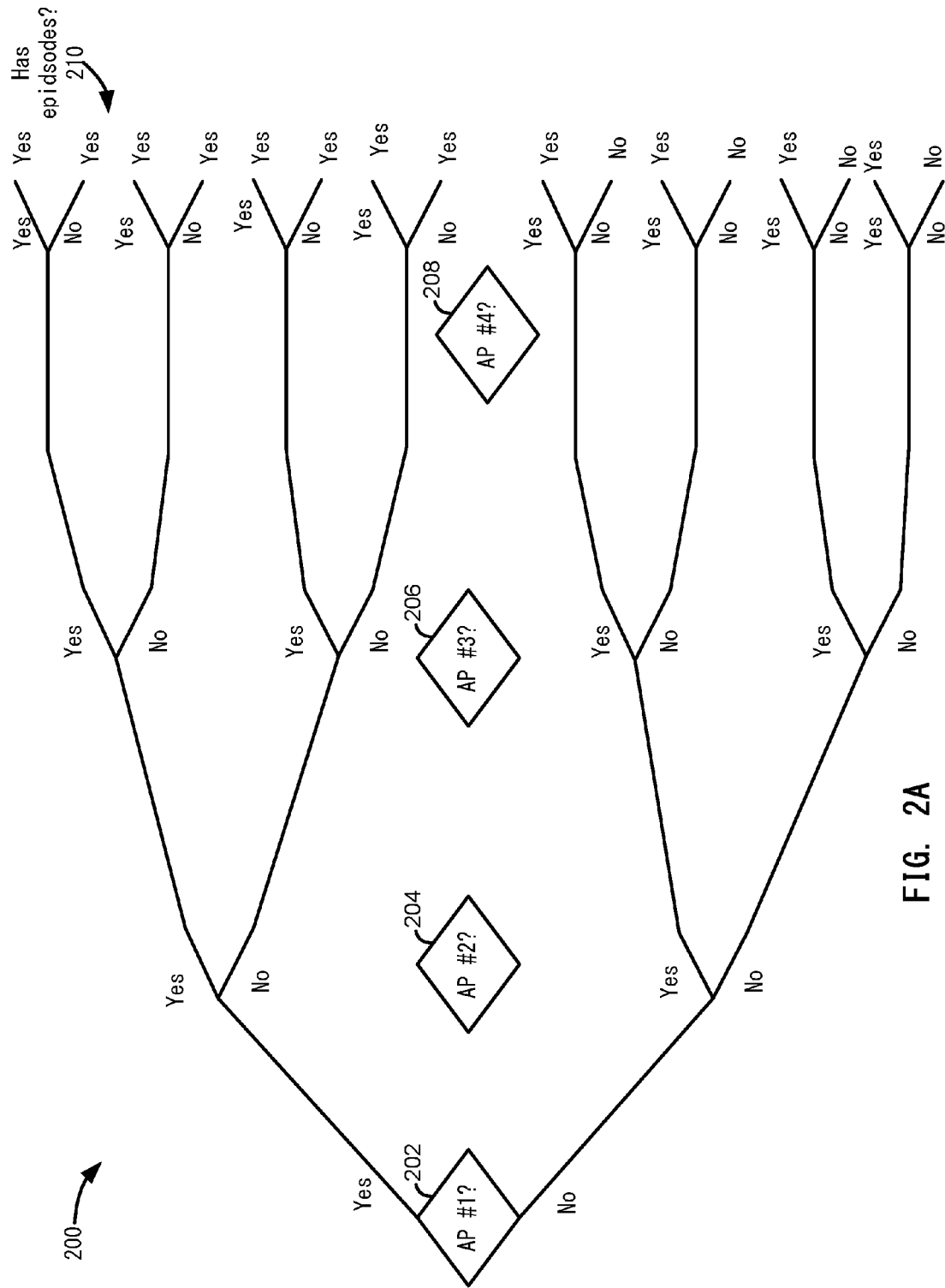
FIG. 2A shows an example that generates all possible authorization package combinations according to one embodiment.
Figure 2B:
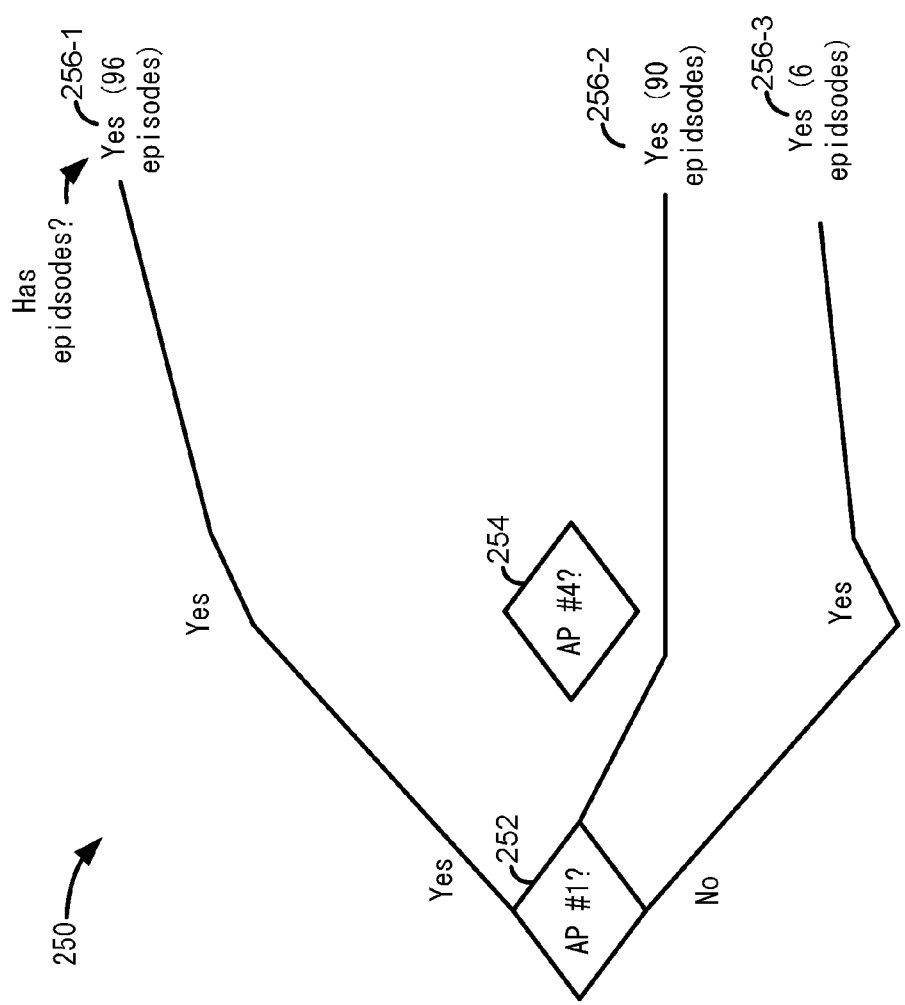
FIG. 2B shows an example of only creating a subset of possible authorization package combinations according to one embodiment.

FIGS. 2A and 2B show an illustrative example for generating authorization package combinations according to one embodiment. FIG. 2A shows an example 200 that generates all possible authorization package combinations according to one embodiment and FIG. 2B shows an example 250 of only creating a subset of possible authorization package combinations according to one embodiment.

Referring to FIG. 2A, for a show, video delivery service system 102 may want to determine for which users the show has available episodes that users are authorized to access. This depends on the user's authorization packages. For example, there may be 4 authorization packages the user may currently subscribe to, shown as a 1st authorization package (AP #1), a 2nd authorization package (AP #2), a 3rd authorization package (AP #3), and a 4th authorization package (AP #4). The user may not subscribe to any other authorization packages offered by the video delivery service.

These authorization packages may be associated with various television channels or other subscriptions for the video delivery service. For example, the video delivery service may have a plus service authorization package or a classic service authorization package. The plus service may provide access to more videos than the classic service. For each different package, authorization package processor 112 needs to calculate every single possible combination. For 4 authorization packages, this yields 16 different combinations that can occur.

At 202, the video delivery service determines whether or not a user has the $1^{st}$ authorization package. In this case, the answer could be "yes" or "no" meaning the user has access to the $1^{st}$ authorization package or not. Then, at 204, the video delivery service determines if the user has access to the $2^{nd}$ authorization package. The decision is made for both branches from the $1^{st}$ authorization package. After that, at 206, the video delivery service determines if the user has access to the $3^{rd}$ authorization package. This determination is made for each of the 4 possible combinations. Then, at 208, the video delivery service determines if a user has the $4^{th}$ authorization package. This determination needs to be performed for the 8 branches from the $3^{rd}$ authorization package.

The decisions yields 16 different possible combinations that can occur for the 4 authorization packages. Further, at 210, another value may indicate whether or not episodes are available for the different combinations. For example, different authorization package combinations may have a different number of episodes available, and different combinations may change the episode count that is available. For example, for one authorization package combination, a user may have access to this show with 90 number of episodes, and for a second authorization package combination, the user may have access to this show but a different number of episodes, such as 96 episodes. The user has access to different number of episodes because different packages allow access to different episodes. Also, entries with "no" may not have any episodes available. Because all possible authorization package combinations have been generated, a user would fall within one of these combinations exactly. Accordingly, if an entry in table 110 is stored for each different combination, an exact match can be found for a user. That is, all users would have one of these combination of authorization packages. This requires that a value be stored for all the possible combinations from 202, 204, 206, and 208. However, due to the disadvantages discussed above, generating every single possible authorization package may not be needed.

Referring to FIG. 2B, example 250 shows the subset of possible authorization package combinations for authorization package #1 and authorization package #4. Whether or not the user has authorization package #2 and/or authorization package #3 does not affect whether or not the user has access to episodes for this show. Thus, authorization package processor 112 does not need to use those packages in the subset of possible authorization package combinations.

At 252, authorization package processor 112 determines whether or not the user has authorization package #1. As above, the answer may be "yes" or "no". Then, at 254, authorization package processor 112 determines if the user has access to authorization package #4. In this case, only when the user has access to the show is an entry stored in authorization table 110. This authorization package combination has episodes of a number of 96 episodes. This is when a user has authorization package #1 and also authorization package #4.

At 256-2, when a user has only authorization package #1, this authorization package combination has 90 episodes available. The reason the number of episodes of 90 may be less than the first combination shown at 256-1 is the second authorization package may have 6 episodes for the current season while the authorization package #1 may have 90 episodes from previous seasons. At 256-3, the user would not have authorization package #1 but would have authorization package #4. In this case, the count of available episodes is 6. Using the example above, the user may only have access to the current season of episodes for the show but not any of the previous seasons for this authorization package combination.

Using the subset of possible combinations, authorization package processor 112 stores 3 values for the show in table 110 as package group identifiers (IDs). The 3 values may identify the three different authorization package combinations. It can be assumed that all users not having one of these 3 authorization package combinations do not have any of the episodes available for the show. For users matching one of these combinations, the rest of the authorization packages do not matter.

Authorization package processor 112 may also store other information for the authorization package combinations. For example, authorization package processor 112 stores the sub-entity count, the latest video sub-entity added date, clips count, and total video sub-entity count. The sub-entity count is the number of sub-entities in this authorization package combination (e.g., the number of episodes that are authorized by this combination. The latest video sub-entity added date is a latest date that an episode has been added to the authorization package combination (e.g., an episode was released to the video delivery service and available). The clips count is a number of clips. The total video sub-entity count is the total possible video sub-entities for this video entity.

Figure 2C:
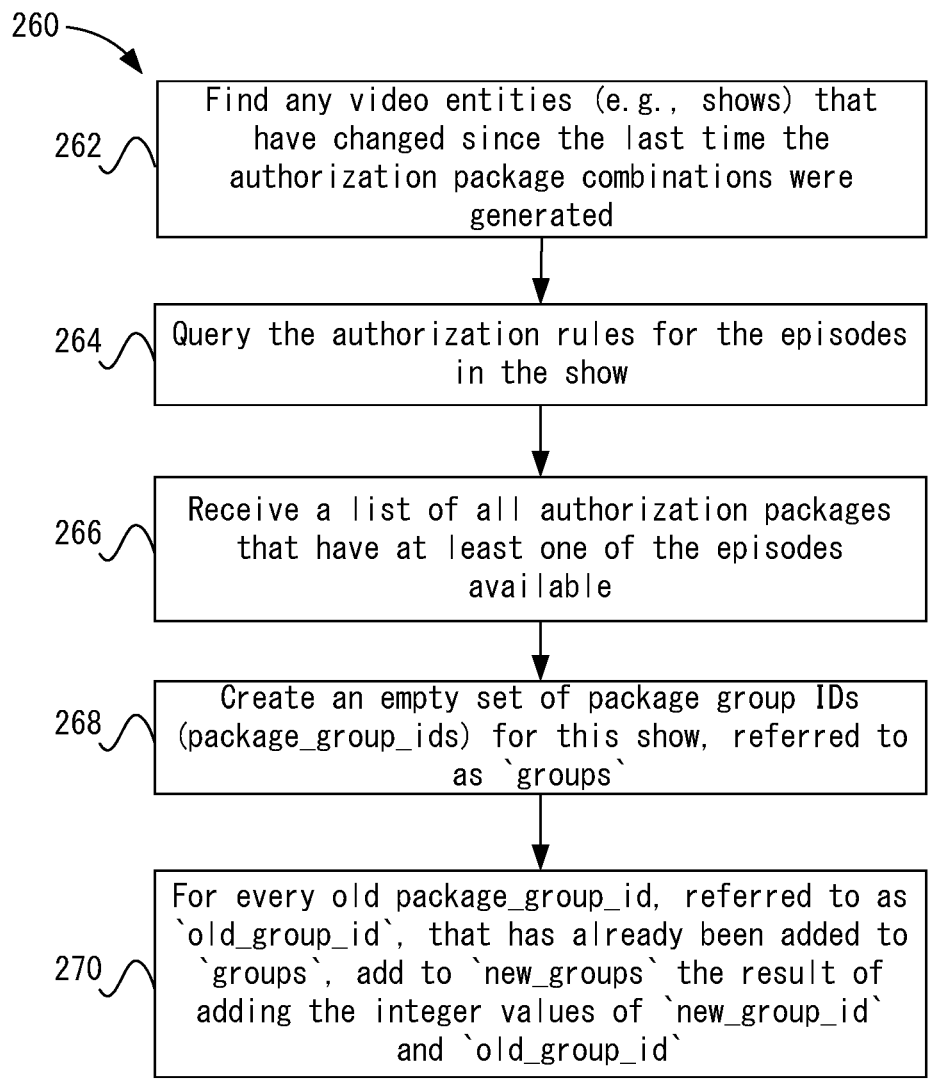
FIG. 2C depicts a simplified flowchart for generating the authorization package combinations according to one embodiment.

To generate the subset of authorization package combinations, authorization package processor 112 determines meaningful packages that need to be stored in authorization table 110. FIG. 2C depicts a simplified flowchart 260 for generating the authorization package combinations according to one embodiment. At 262 authorization package processor 112 finds any video entities (e.g., shows) that have changed since the last time the authorization package combinations were generated. This process can also be run at the beginning to generate the authorization package combinations for all shows. Shows and episodes will be used for discussion purposes.

For each show, the following process is performed. At 264, authorization package processor 112 queries the authorization rules for the episodes in the show. The authorization rules show what authorization packages in which the different episodes are available. At 266, authorization package processor 112 receives a list of all authorization packages that have at least one of the episodes available. This means the authorization package authorizes access to at least one episode.

Then, at 268, authorization package processor 112 creates an empty set of package group IDs (package_group_ids) for this show, referred to as 'groups'. For each of those packages, authorization package processor 112 computes the package_group_id for the package group that would contain only that package (just the single package) and calls these package groups 'new_groups'. Authorization package processor 112 can use the formula ($2^{(package\_id-1)}$) to generate the package group ID. This package group ID maybe referred to as 'new_group_id'.

After creating the new groups, at 270, for every old package_group_id, referred to as 'old_group_id', that has already been added to 'groups', authorization package processor 112 adds to 'new_groups' the result of adding the integer values of 'new_group_id' and 'old_group_id'. The authorization processor then adds to 'groups' everything in 'new_groups'. The above process looks at each package that has an episode of the show available, and then steps through them one at a time, storing new package_group_ids that are the result of having both any already-seen package_group_ids and this new package. The package group IDs are generated in sequence and in a way such that authorization package processor 112 can perform a query to select a correct authorization package combination from the subset. In the end, package group IDs are created for a subset of authorization package combination that are meaningful in a specific order.

Because only a subset of authorization package combinations may be generated for a video entity, when it is time to determine what video sub-entities a user can have access to, a client 108 may supply a package group ID (package_group_ID). Alternatively, the video delivery system may determine the package group ID for a user/client. The package group ID identifies the authorization package combination. However, this package group ID may not exactly match a value in a row in authorization table 110 because not all combinations were generated. To overcome this, video delivery service system 102 may use authorization package processor 112 to generate a query that can calculate which authorization package combinations apply to the package group ID. That is, authorization package processor 112 can determine rows in authorization table 112 that contain at least one of the packages the user has access to, but does contain any authorization packages the user does not have access to. This querying process may take longer than if an exact match was found when all possible combinations were generated. However, the time may be minimal, but particular embodiments use less memory and also the time taken to regenerate the authorization package group combinations when a new package is received is reduced. Every time a new package is received, the authorization package group combinations may be generated again starting over from nothing. Then, authorization package processor 112 can select one of the authorization package combinations that has the largest number of matches that a user may have access to. The query process is described now in FIGS. 3A-3G.

Authorization Table

FIG. 3A depicts an example of authorization table 110 showing authorization package combinations according to one embodiment. Columns 302-1-302-4 depict a show identifier (show_ID), a device identifier (device_ID), a package group identifier (package_group_ID), and an episodes count (episodes_count), respectively. The show ID identifies a specific show, such as a television show. This television show has different episodes that may be organized by season. The device ID identifies the device that can be used to view the show, such as a mobile device or living room device. Each different device may require different authorization packages. The package group ID is the identifier for the authorization package combination and is represented as a binary number. The episodes count is the number of episodes for that authorization package combination. Each row 304-1-304-3 is a different authorization package combination. For example, package group #2 (package_group_id) is authorization package #2, package group #256 is authorization package #256, package group #258 is authorization package #9 and #2. The corresponding binary values are 000000010 (package group #2), 100000000 (package group #256), and 100000010 (package group #258). The package group numbers correspond to the bit placement of 1 and 0's in the binary number.

Not all authorization package combinations are provided in table 110. For example, there may be authorization package combinations #4, #5, #6, etc. However, authorization package processor 112 can determine which episodes a user has access to using table 110 and a specialized query that performs a computation. For example, FIG. 3B shows an example of a query 306 according to one embodiment. Using query 306, authorization package processor 112 can determine which authorization package combinations and videos the user can access. Consider the example where the user has access to package group #29379. Package group #29379 includes a lot of packages that are not relevant to this particular show #35. For example, the package group #29379 may be represented as a sequence of bits:

111001011000011.

However, show #35 may only have availability rules up to package group 258, which is represented by the sequence of bits:

000000100000010.

FIG. 3C shows the first sequence of bits at 308 and the second sequence of bits at 310 according to one embodiment. A "0" as a bit indicates that the user does not have access to a package corresponding to that bit and a value of "1" indicates that the user does have access to a corresponding package.

The packages can be counted from right to left in the sequence of bits. Show #35 has availability rules for packages #2 and #9 as shown by the bits equaling "1" at 312-1 and 312-2 in FIG. 3C. Also, the user can access packages #1, #2, #7, #8, #10, #13, #14, and #15 due to the bits equaling "1" in the bit sequence at 308 in FIG. 3C. Looking at the bit sequences, authorization package processor 112 can determine that the only overlap where the user has access to a package and the show is available for package 2 at 312-1 and 314-1. Particular embodiments recognize this and authorization package processor 112 uses query 306 to determine which packages the user has access to for this show without storing every single authorization package combination in table 110. That is, using the filtering conditions in query 306, authorization package processor 112 does not need to store every single combination in table 110 to determine if package #29379 has access to packages #2, #256, and #258. Instead, authorization package processor 112 uses the authorization package combinations of #2, #256, and #258 to determine the available videos for package #29379.

Referring to query 306 in FIG. 3B, a condition 316 using bitwise logic is shown as "package_group_ID & 29379=package_group_ID". This condition may be two parts. In the first part, the "&" operation to the left of the "=" sign results in a new binary number that only includes the bits that the package_group_ID had in common with package group #29379. That is, this filters out any rows in table 110 that solely reference authorization packages that the user does not have any access to at all. For example, FIG. 3D shows an example of an expanded table 320 to include the result of the binary "&" operation according to one embodiment. Thus, this condition filters out package_group_id #256 since the result of this condition is 0 in table 320 in FIG. 3D.

Figure 3E:
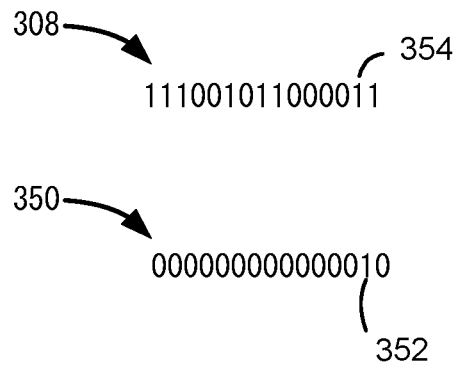
FIG. 3E shows a bitwise arithmetic example for comparing package group #2 and package group #29379 according to one embodiment.

FIG. 3E shows a bitwise arithmetic example for comparing package group #2 and package group #29379 according to one embodiment. At 308, the same user authorizations are shown. At 350, the authorizations for package #2 are shown. This includes a "1" bit at 352 indicating package #2 is authorized. The result is "2" for package group #2 because the only bitwise comparison where both bit sequences have a "1" is at 352 and 354. This yields a value of "0000000000000010" or "2".

Figure 3F:
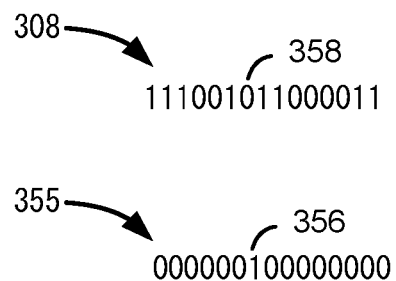
FIG. 3F shows a bitwise arithmetic example for comparing package group #256 and package group #29379 according to one embodiment.

FIG. 3F shows a bitwise arithmetic example for comparing package group #256 and package group #29379 according to one embodiment. At 308, the same user authorizations are shown. At 355, the authorizations for package #256 are shown. This includes a "1" bit at 356 indicating package #9 is authorized. The result is "0" for package group #256 because no bitwise comparison where both bit sequences have a "1" are found. At 356, the value is "1" for authorization package #9, but the user authorization value is "0" at 358. This yields a value of "0000000000000000" or "0".

Figure 3G:
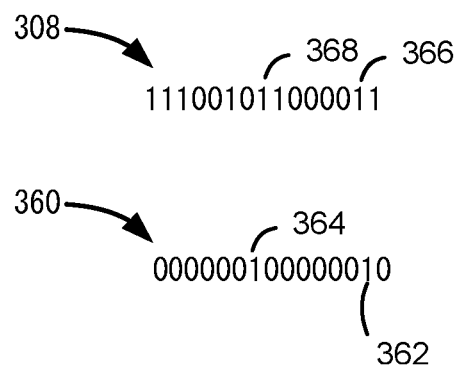
FIG. 3G shows a bitwise arithmetic example for comparing package group #258 and package group #29379 according to one embodiment.

FIG. 3G shows a bitwise arithmetic example for comparing package group #258 and package group #29379 according to one embodiment. At 308, the same user authorizations are shown. At 360, the authorizations for package #256 are shown. This includes a "1" bit at 362 indicating package #2 is authorized and at 364 indicating package #9 is authorized. The result is "2" for package group #2 because the only bitwise comparison where both bit sequences have a "1" is at 352 and 366. At 364 and 368, the values of "0" and "1", respectively yield a "0" value. This yields a value of "0000000000000010" or "2".

In the next part, authorization package processor 112 requires that the result of this operation does not change the number. That is, the result of evaluating the condition is still equal to the original package group ID. If this was not performed, authorization package processor 112 could include rows from table 110 that include packages the user did not have access to. In table 320, a column 322 shows the example of the evaluation of the "&" (e.g., bitwise AND) condition. The numbers in the rows for column 322 represent the package group ID, which can be converted to a binary number. For example, the number of 2 may be converted to a value of "10". The result of using package group #29379 does not include package #9. That is, for the value package group ID 256 for package #9, the conversion is 2^(package_ID-1)). For the package group ID #258, the overlap is package group #2. The equality restriction in condition 316 of query 306 then determines that package group #258's condition, 258 & 29379 does not equal 258 because as shown in FIG. 3G, the value of 2 does not equal 258. This check is to make sure authorization package processor 112 does not consider this row. This is because package #258 includes package 9, which the user does not have access to. However, the calculation for package group #2 results in the value 2, since the second bit in 29379 is set as shown in FIG. 3E. In general, authorization package processor 112 first selects the package groups that have any overlap with the user's package group. These package groups may have packages that the user does not have access to though. This would have selected package groups #2 and #258. Then, authorization package processor 112 filters out the package groups from authorization table 110 that contain more than just the user's package groups. The equality check does the filter check since package groups in table 110 with more packages than the user's package group ID would lose those extra bits when the AND operation is performed with the user's package group ID. For example, for package group #258, the extra authorizations in package group 258 cause the AND operation to have a different value ("2") than the package group ID for the user.

Referring back to query 306 in FIG. 3B, at 324, the term "SELECT MAX(package$_{13}$ group_ID)" is evaluated. This condition selects the row with the package group ID of #2 (package_group_ID=2) as in this example there is only one match. However, if the user had access to package 9 as well (possibly with package group id #29635, where the package 9 bit is set to 1), this condition would select package group ID #258 because the row for package group #2 would incorrectly indicate that the user does not have access to the 8 episodes in package group #256. For example, package group #2 may be all prior seasons and package group #9 may be the current season. A combination that includes both the prior seasons and the current season is needed for this user. In this case, package group #258 may be used because package group #258 includes both the prior seasons and the current season. Alternatively, if there are some episodes in package #2 that did not overlap with ones in package #256, neither the rows for package group #2 or package group #256 on their own would have as high an episode count as for package group #258. In this example, package group #2 has 113 episodes and package group #256 has 8 episodes available. The result of the above evaluation of query 306 would select package group ID #258, which does have more episodes available than any of the individual other rows where 121 episodes are available for this authorization package.

Accordingly, authorization package processor 112 selects the row in table 110 with the highest package group ID because when generating table 110, authorization package processor 112 calculates a row for every distinct combination of meaningful packages. The best complete match for any user package group is considered the one with the most matches, and since authorization package processor 112 generated table 110 to have every meaningful package combination, authorization package processor 112 does not have to decide between just packages #1 and #9 and packages #1 and #2. Authorization package processor 112 knows that if both packages #1, #2, and #9 are meaningful and exist in any combination in the first place, then there is a combination for #1, #2, and #9 in table 110. This is because packages #1, #2, and #9 are considered meaningful and authorization package processor 112 would generate a combination for those three packages in its own row, which would be a higher row number or package ID than only packages #1 and #2 together.

Query Generation and User Interface Generation

Figure 4:
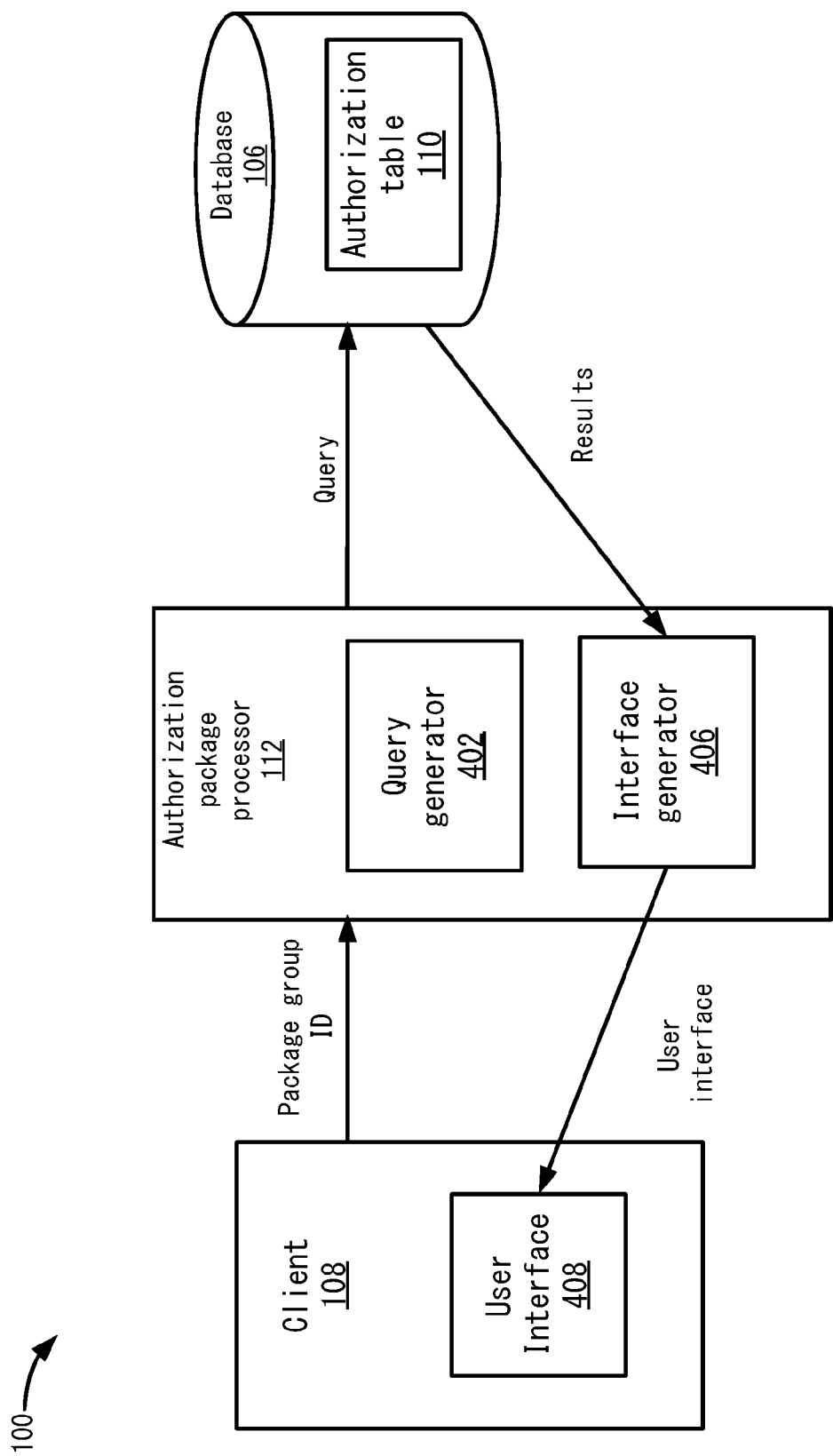
FIG. 4 depicts a more detailed example for processing queries according to one embodiment.

The queries for show availability may be performed at different times and for different shows. For example, when a user logs into an interface, the interface needs to generate a list of shows that are available to a user. It is important that the user not be shown access to a show the user does not have access to. In one example, the interface may have ten trays for different categories. Authorization package processor 112 would perform queries for shows for the ten trays to determine if the user has access to episodes of the shows. FIG. 4 depicts a more detailed example for processing queries according to one embodiment. In one example, a client 108 may provide a package group ID for a user. This package group ID is used to determine which shows a user has access to. For example, when a user logs on to the video delivery service, video delivery service system 102 needs to generate a user interface for that user to display on client 108.

A query generator 402 can generate a query to database 106 to determine which shows the user has access to. These shows can then be provided on a user interface. The query may use bitwise arithmetic to determine the authorization package combination. For example, an exact match of a row in authorization table 110 may not be found using the package group ID. Rather, multiple possible combinations may be first found. Then, query generator 402 determines which of these matches is the best match. In one embodiment, the best match may be the possible authorization package combination that includes the most packages the user has access to. This may be the number having the most bits (e.g., the most packages in common) with the largest integer value. An interface generator 406 then generates a user interface 408 on client 108 using the available shows.

Table 110 may also have a listing of when the latest episode for the available episodes was released. Interface generator 406 uses this to generate user interface 404. For example, interface generator 406 may order the shows in the interface, such as order the shows in a tray that have the most recent or freshest episodes. The release date may also be used to provide recommendations to the user to watch episodes based on which shows have recent episodes released.

Method Flow

Figure 5:
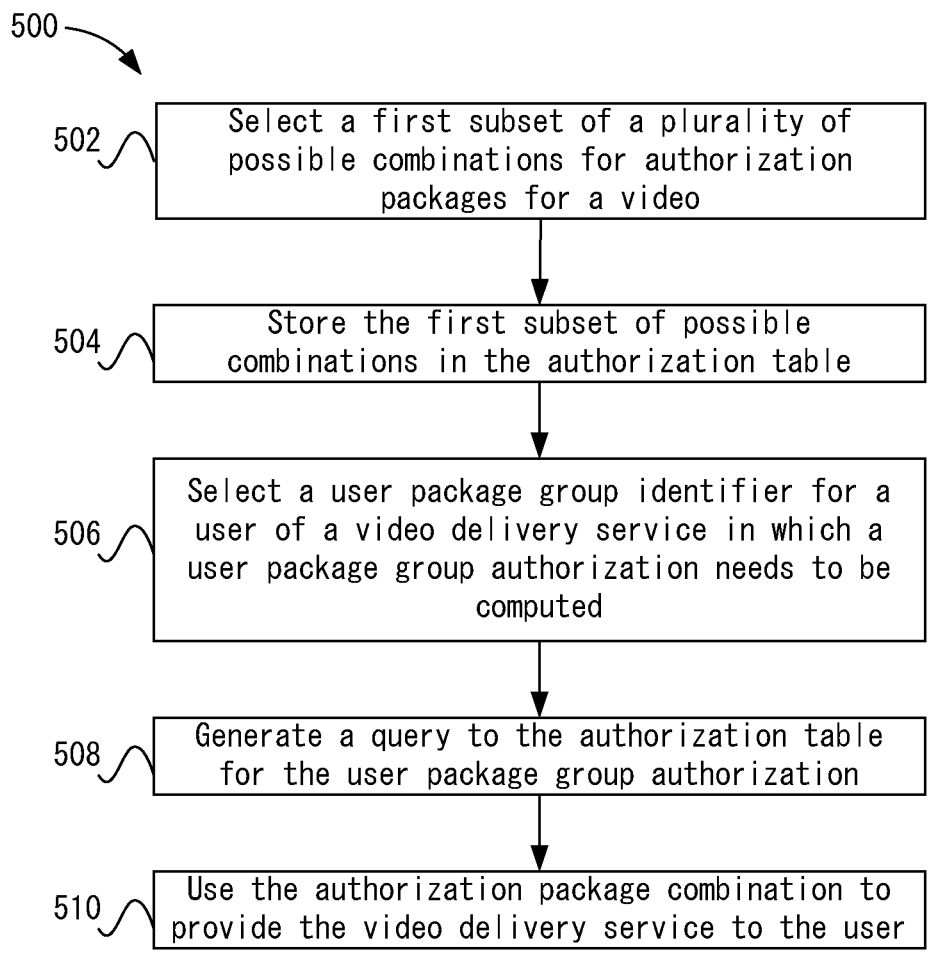
FIG. 5 depicts a simplified flowchart for determining which authorization package combination to apply to a user according to one embodiment.

FIG. 5 depicts a simplified flowchart 500 for determining which authorization package combination to apply to a user according to one embodiment. At 502, authorization package processor 112 selects a first subset of a plurality of possible combinations for authorization packages for a video. These may be meaningful combinations. Then, at 504, authorization package processor 112 stores the first subset of possible combinations in authorization table 110. The possible combinations that are not meaningful are not stored in authorization table 110.

At 506, authorization package processor 112 selects a user package group identifier for a user of a video delivery service in which a user package group authorization needs to be computed. For example, client 108 may send the user package group identifier to video delivery system 102.

At 508, authorization package processor 112 generates a query to authorization table 110 for the user package group authorization. As discussed above, the query selects a plurality of the first subset of possible combinations and then selects an authorization package combination from the plurality of the first subset of possible combinations. At 510, video delivery service system 102 uses the authorization package combination to provide the video delivery service to the user. For example, user interface 408 is generated to include the episodes that are available to the user.

System Overview

Figure 6:
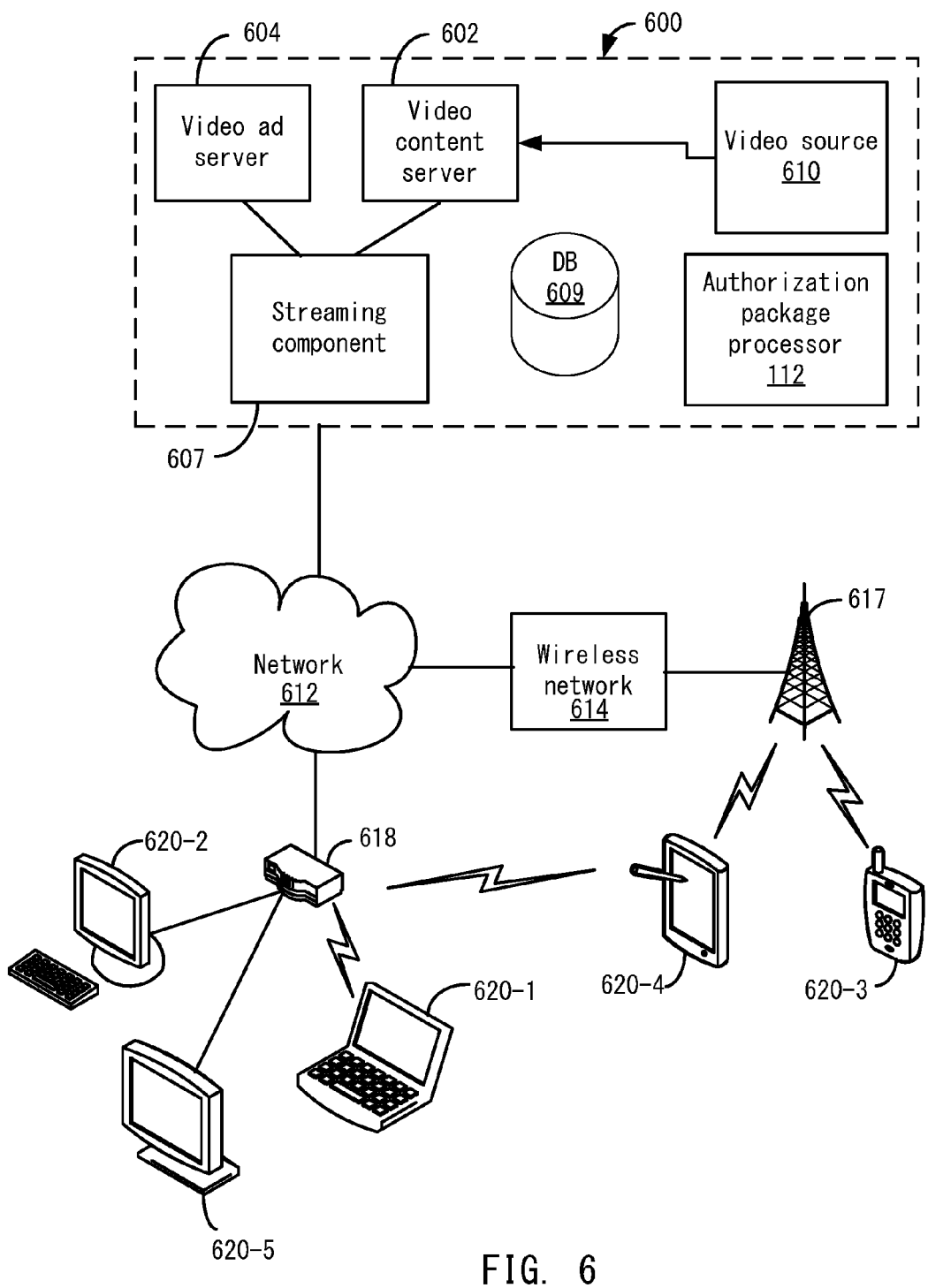
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and/or 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 600, a public service message, or some other information. The video advertising server 604 may serve the video advertising segments as directed by a user interface controller (not shown).

The video streaming system 600 also may include authorization package processor 112.

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless cellular telecommunications network (WCS) 614, or some combination of these or similar networks.

One or more client devices 620 may be in communication with the video streaming system 600, via the data communication network 612 and/or other network 614. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for a wireless telephony network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HTTP and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
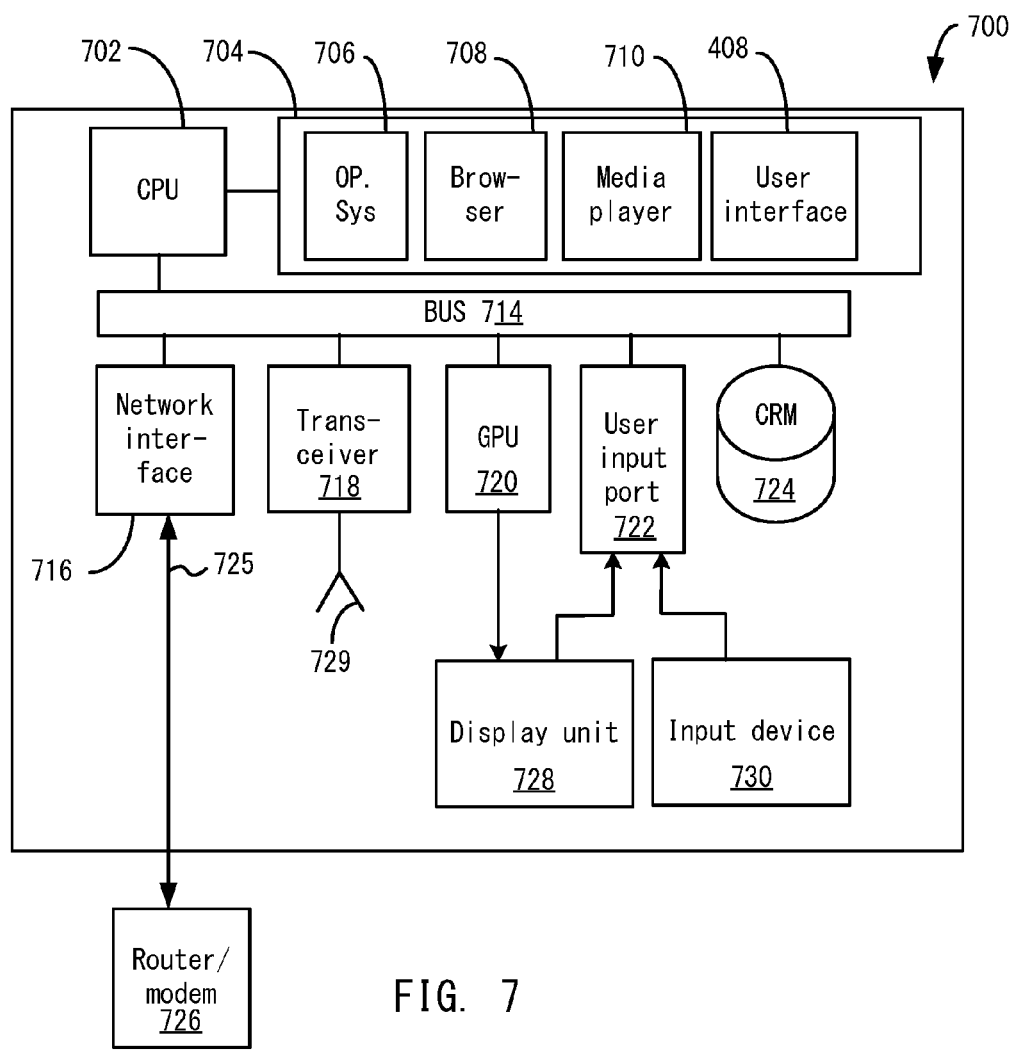
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include user interface 408. The memory 704 may hold additional modules not shown in FIG. 7, for example modules for performing other operations described elsewhere herein.

A bus 714 or other communication component may support communication of information within the apparatus 700. The processor 702 may be a specialized or dedicated microprocessor configured to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules 706, 708, 710 and 712 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured to perform one or more operations of a method as described herein.

A communication interface 716 may also be connected to the bus 714. The communication interface 716 may provide or support two-way data communication between the apparatus 700 and one or more external devices, e.g., the streaming system 600, optionally via a router/modem 726 and a wired or wireless connection. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a plurality of authorization packages for a video entity including a plurality of episodes, wherein at least two of the plurality of authorization packages include different sets of episodes from the plurality of episodes;
   generating, by the computing device, a first subset of possible combinations in a plurality of possible combinations for the plurality of authorization packages, wherein at least a portion of the plurality of possible combinations includes two or more of the plurality of authorization packages;
   storing, by the computing device, the first subset of possible combinations in a database table, wherein a second subset of possible combinations in the plurality of possible combinations is not stored in the database table;
   selecting, by the computing device, a user package group identifier for a user of a video delivery service in which a user package group authorization needs to be computed;
   generating, by the computing device, a query to the database table for the user package group authorization, the query selecting a plurality of the first subset of possible combinations and then selecting a combination from the plurality of the first subset of possible combinations; and
   using, by the computing device, the combination from the plurality of the first subset of possible combinations to provide access to a set of episodes of the video entity for the video delivery service to the user.

2. The method of claim 1, further comprising:
   selecting episodes of the video entity that the combination from the plurality of the first subset of possible combinations indicates are included in the combination; and
   indicating those episodes are available to the user for the video delivery service.

3. The method of claim 1, wherein the query uses a bitwise AND operation of the user package group identifier and video package group identifiers for the first subset of possible combinations to select the combination from the plurality of the first subset of possible combinations.

4. The method of claim 3, further comprising:
   selecting the combination from the plurality of the first subset of possible combinations based on the combination having a largest number of matches with the user package group identifier.

5. The method of claim 4, wherein storing the first subset of possible combinations comprises generating the possible combinations in an order in which a number of episodes increases as an identifier for the first subset of possible combinations increases.

6. The method of claim 1, wherein storing the first subset of possible combinations comprises selecting meaningful combinations of the possible combinations that only include authorization packages that authorize access to one of the episodes of the video entity.

7. The method of claim 6, wherein each distinct combination of the meaningful combinations is stored for the first subset of possible combinations.

8. The method of claim 1, wherein storing the first subset of possible combinations comprises storing each of the subset of possible combinations with a respective video package group identifier.

9. The method of claim 8, wherein the video package group identifier is a first bit sequence and the user package group identifier is a second bit sequence, wherein each bit in the first bit sequence and the second bit sequence is an authorization package rule for a respective authorization package.

10. The method of claim 9, wherein the query performs a bitwise AND operation on the first bit sequence and the second bit sequence to generate the plurality of the first subset of possible combinations.

11. The method of claim 10, wherein the query performs an equality condition to determine whether a result of the bitwise AND operation for each package group identifier is equal to the package group identifier.

12. The method of claim 1, further comprising:
determining a latest episode date for the combination from the plurality of the first subset of possible combinations.

13. A non-transitory computer-readable storage medium containing instructions, that when executed, control a computer system to be configured for:
determining a plurality of authorization packages for a video entity including a plurality of episodes, wherein at least two of the plurality of authorization packages include different sets of episodes from the plurality of episodes;
generating a first subset of possible combinations in a plurality of possible combinations for the plurality of authorization packages, wherein at least a portion of the plurality of possible combinations includes two or more of the plurality of authorization packages;
storing the first subset of possible combinations in a database table, wherein a second subset of possible combinations in the plurality of possible combinations is not stored in the database table;
selecting a user package group identifier for a user of a video delivery service in which a user package group authorization needs to be computed;
generating a query to the database table for the user package group authorization, the query selecting a plurality of the first subset of possible combinations and then selecting a combination from the plurality of the first subset of possible combinations; and
using the combination from the plurality of the first subset of possible combinations to provide access to a set of episodes of the video entity for the video delivery service to the user.

14. The non-transitory computer-readable storage medium of claim 13, further configured for:
selecting episodes of the video entity that the combination indicates are included in the combination; and
indicating those episodes are available to the user for the video delivery service.

15. The non-transitory computer-readable storage medium of claim 13, wherein the query uses a bitwise AND operation of the user package group identifier and identifiers for the first subset of possible combinations to select the combination from the plurality of the first subset of possible combinations.

16. The non-transitory computer-readable storage medium of claim 14, further configured for:
selecting the combination from the plurality of the first subset of possible combinations based on the combination having a largest number of matches with the user package group identifier.

17. The non-transitory computer-readable storage medium of claim 16, wherein storing the first subset of possible combinations comprises generating the possible combinations in an order in which a number of episodes increases as an identifier for the first subset of possible combinations increases.

18. The non-transitory computer-readable storage medium of claim 13, wherein storing the first subset of possible combinations comprises storing each of the subset of possible combinations with a video respective package group identifier.

19. The non-transitory computer-readable storage medium of claim 18, wherein the package group identifier is a first bit sequence and the user package group identifier is a second bit sequence, wherein each bit in the first bit sequence and the second bit sequence is an authorization package rule for a respective authorization package.

20. The non-transitory computer-readable storage medium of claim 19, wherein:
the query performs a bitwise AND operation on the first bit sequence and the second bit sequence to generate the plurality of the first subset of possible combinations, and
the query performs an equality condition to determine whether a result of the bitwise AND operation for each package group identifier is equal to the package group identifier.

21. An apparatus comprising:
one or more computer processors; and
a non-transitory computer-readable storage medium comprising instructions, that when executed, control the one or more computer processors to be configured for:
determining a plurality of authorization packages for a video entity including a plurality of episodes, wherein at least two of the plurality of authorization packages include different sets of episodes from the plurality of episodes;
generating a first subset of possible combinations in a plurality of possible combinations for the plurality of authorization packages, wherein at least a portion of the plurality of possible combinations includes two or more of the plurality of authorization packages;
storing the first subset of possible combinations in a database table, wherein a second subset of possible combinations in the plurality of possible combinations is not stored in the database table;
selecting a user package group identifier for a user of a video delivery service in which a user package group authorization needs to be computed;
generating a query to the database table for the user package group authorization, the query selecting a plurality of the first subset of possible combinations and then selecting a combination from the plurality of the first subset of possible combinations; and
using the combination from the plurality of the first subset of possible combinations to provide access to a set of episodes of the video entity for the video delivery service to the user.

* * * * *